United States Patent
Kim et al.

(10) Patent No.: US 10,251,493 B2
(45) Date of Patent: Apr. 9, 2019

(54) END CAP FOR SHOWCASE ROLLER SHELF

(71) Applicant: SEIDAE INDUSTRIAL CO., LTD., Goyang, Gyeonggi-do (KR)

(72) Inventors: Moonsik Kim, Gyeonggi-do (KR); Jeongho Shin, Gyeonggi-do (KR)

(73) Assignee: SEIDAE INDUSTRIAL CO., LTD., Goyang, Gyeonggi-do (KR)

( * ) Notice: Subject to any disclaimer, the term of this patent is extended or adjusted under 35 U.S.C. 154(b) by 0 days.

(21) Appl. No.: 15/631,227

(22) Filed: Jun. 23, 2017

(65) Prior Publication Data

US 2017/0280894 A1   Oct. 5, 2017

Related U.S. Application Data

(63) Continuation of application No. PCT/KR2015/002258, filed on Mar. 9, 2015.

(30) Foreign Application Priority Data

Dec. 23, 2014   (KR) .................. 10-2014-0187552

(51) Int. Cl.
*A47F 1/12* (2006.01)
*B65G 1/02* (2006.01)
*B65G 13/11* (2006.01)

(52) U.S. Cl.
CPC ............... *A47F 1/12* (2013.01); *B65G 1/023* (2013.01); *B65G 1/026* (2013.01); *B65G 13/11* (2013.01)

(58) Field of Classification Search
CPC .. A47F 1/12; A47F 1/125; A47F 1/126; A47F 7/28; A47F 5/0043; A47F 1/04;
(Continued)

(56) References Cited

U.S. PATENT DOCUMENTS 4,696,406 A * 9/1987 Karashima ........... A47B 96/021
                                                  108/110
9,038,804 B1 * 5/2015 Nickell ................. B65G 13/11
                                                  193/35 R
(Continued)

FOREIGN PATENT DOCUMENTS

DE   202009013638 U1   1/2010
JP   2001-029186 A     2/2001
(Continued)

*Primary Examiner* — Hiwot E Tefera
(74) *Attorney, Agent, or Firm* — Mintz Levin Cohn Ferris Glovsky and Popeo, P.C.; Kongsik Kim; Jhongwoo Jay Peck (57) ABSTRACT

The present invention relates to an end cap for a showcase roller shelf. The end cap for a showcase roller shelf according to an embodiment of the present invention, in a state where roller unit bodies including casings enclosing the outer perimeter of a roller support body are arranged in a plurality of rows, is inserted into and is supported on both ends of each casing while a plurality of rollers are rotatably supported on the roller support body so as to slide a product on the inside of a showcase and move the product to a withdrawal location. The end cap for a showcase roller shelf comprises: cap bodies which are disposed on both ends of each casing so as to face each other, and are installed on locations crossing both ends of each casing disposed in a plurality of rows; and a plurality of protruding bodies which: protrude from locations where the cap bodies face each other so as to be inserted into both ends of each casing disposed in a plurality of rows, wherein the protrusion distances thereof are adjusted so that the rollers arranged in a plurality of rows in locations where the plurality of casings are inserted are positioned at locations where rotation centers are different in each row; and protrude alternately repeatedly while the protrusion distances thereof, by which an adjacent (Continued)

row among a plurality of row locations is supported, are different from each other.

8 Claims, 6 Drawing Sheets

(58) Field of Classification Search
CPC ....... A47F 5/005; A47B 96/021; B65G 13/11; B65G 1/023; B65G 1/08; B65G 1/026; B65G 39/12; B65D 39/10
USPC .................................. 211/59.2, 151; 193/37
See application file for complete search history.

(56) References Cited

U.S. PATENT DOCUMENTS

| | | | |
|---|---|---|---|
| 2001/0017284 A1 | 8/2001 | Watanabe | |
| 2010/0072152 A1* | 3/2010 | Kim | A47F 1/12 211/151 |
| 2010/0078402 A1* | 4/2010 | Davis | A47B 57/585 211/184 |
| 2011/0186401 A1* | 8/2011 | Brugmann | A47F 1/125 193/37 |
| 2014/0299560 A1* | 10/2014 | Kim | A47F 1/126 211/59.2 |
| 2015/0114918 A1* | 4/2015 | Nickell | B65G 13/11 211/59.2 |
| 2017/0305670 A1* | 10/2017 | Tong | B65G 23/44 |

FOREIGN PATENT DOCUMENTS

| | | |
|---|---|---|
| JP | 2010-537705 A | 12/2010 |
| JP | 2013-202350 A | 10/2013 |
| KR | 20-0292985 Y1 | 10/2002 |
| KR | 20-0327237 Y1 | 9/2003 |
| KR | 10-2012-0094295 A | 8/2012 |
| KR | 10-1389747 B1 | 5/2014 |
| WO | 2009075409 A1 | 6/2009 |

* cited by examiner

END CAP FOR SHOWCASE ROLLER SHELF

CROSS-REFERENCE TO RELATED APPLICATIONS

This application is a continuation application of International Application No. PCT/KR2015/002258 filed on Mar. 9, 2015, which claims priority to Korean Application No. 10-2014-0187552 filed on Dec. 23, 2014, which applications are incorporated herein by reference.

TECHNICAL FIELD

The present disclosure relates to an end cap for a showcase roller shelf, and more particularly, to an end cap for a showcase roller shelf, in which when end cap structures installed to support both ends of the showcase roller shelf on which displayed goods slide in a contact manner are arranged in a plurality of columns, a roller unit having a plurality of standardized rollers that are rotatably installed in misalignment in each column and thus increase a contact area can be installed in each column, thereby improving productivity and assembliness.

BACKGROUND ART

In general, a showcase is a box structure installed in a shop to display goods. The front of the showcase is transparent so that a customer may see the goods from the outside of the showcase and withdraw one from the showcase.

Such a showcase is installed in a place such as a market or a convenience store. As shelves are provided to display goods by type inside the showcase, the showcase increases convenience with which a customer may identify and select goods, and facilitates the customer to withdraw goods.

A plurality of items are kept on a shelf installed in the showcase. Rollers are installed on surfaces contacting with items in the showcase so that after the customer purchases an item placed on an end of the shelf, the next item may be positioned on the end of the shelf. The shelf is inclined to allow an item to move on the rollers.

For a typical showcase roller shelf, the size and number of rollers are determined according to the size and width of the shelf, a frame is fabricated to support the rollers rotatably according to the determined size and number of rollers, and the fabricated roller shelf is installed at a user-intended position.

Recently, showcase roller shelves have been commercialized, in which roller units are arranged in misalignment in a plurality of columns so that the roller units may have different center axes in the respective columns, and thus goods may slide down more smoothly.

In such a showcase roller shelf, two types of roller units having different steps are arranged alternately so that rollers of the roller units in adjacent columns among the plurality of columns may be placed at different rotation center positions. If roller units are not arranged to alternate with each other inadvertently, a wrong roller unit should be removed and replaced with another roller unit, thereby decreasing workability.

Accordingly, there is a need for a structure of a showcase roller shelf which can improve productivity.

SUMMARY

An aspect of the present disclosure devised to solve the conventional problem is to provide an end cap for a showcase roller shelf, which is improved so as to increase a contact area by arranging a plurality of rollers rotatably in one unit to allow goods displayed on the showcase roller shelf to slide in contact with the rollers, and when end cap structures installed to support both ends of the rollers are arranged in a plurality of columns, by arranging the rollers of each column in misalignment.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, an end cap for a showcase roller shelf, which is inserted supportedly into both ends of each casing in a state where a plurality of rollers are rotatably supported by each roller support to slide products inside a showcase to a withdrawal position, and roller units are arranged in a plurality of columns, each roller unit including a casing surrounding the outer periphery of a roller support, includes cap bodies disposed at facing positions at both ends of the casings, and installed at positions across both ends of the casings arranged in a plurality of columns, and a plurality of protrusions protruding at facing positions of the cap bodies, to be inserted into both ends of the casings arranged in the plurality of columns, and alternately repeated, with protrusion distances controlled to place rotation centers of the rollers, which are arranged in the plurality of columns at positions at which the casings are inserted, at different positions in the respective columns, and thus to be different in adjacent columns.

The protrusions may include a first protrusion protruding for a first protrusion distance in the other direction from one portion of a cap body in one part, to be inserted into one of both ends of a casing disposed at an end of one side among the casings arranged in the plurality of columns, a second protrusion disposed in the other part facing the first protrusion, and protruding for a second protrusion distance in one direction from a cap body in the other part, to be inserted into the other end of the casing into which the first protrusion is inserted supportedly, a third protrusion disposed at the other side adjacent to the first protrusion, and protruding for a third protrusion distance in the other direction, to be inserted into one end of a casing positioned at the other side adjacent to the casing supporting the first protrusion, and a fourth protrusion disposed in the other part facing the third protrusion, and protruding for a fourth protrusion distance in the one direction from the cap body positioned in the other part, to be inserted into the other end of the casing into which the third protrusion is inserted supportedly. As the first protrusion distance is different from the third protrusion distance, and the second protrusion distance is different from the fourth protrusion distance, positions of center axes of the rollers installed in the casings supported by the first to fourth protrusions may be misaligned with each other, the first and third protrusions may alternate with each other, being extended according to a length of the cap body disposed in the one part, and the second and fourth protrusions may alternate with each other, being extended according to a length of the cap body disposed in the other part.

As the first protrusion distance is larger than the third protrusion distance, and the fourth protrusion distance is larger than the second protrusion distance by a difference by which the first protrusion distance is larger than the third protrusion distance, the positions of center axes of the rollers installed in the casings supported by the first to fourth protrusions may be misaligned with each other in the columns in which the rollers are rotated.

The difference by which the first protrusion distance is larger than the third protrusion distance may be equal to a difference by which the fourth protrusion distance is larger than the second protrusion distance, and the sum of the differences being the double of the difference may be smaller than a distance between rotation axes of the plurality of rollers in the casings.

Further, the difference by which the first protrusion distance is larger than the third protrusion distance and the difference by which the fourth protrusion distance is larger than the second protrusion distance may be equally ¼ of the distance between the rotation axes of the plurality of rollers in the casings, and the sum of the differences may be ½ of the distance between the rotation axes of the plurality of rollers.

Also, as the third protrusion distance is larger than the first protrusion distance, and the second protrusion distance is larger than the fourth protrusion distance by a difference by which the third protrusion distance is larger than the first protrusion distance, the positions of center axes of the rollers installed in the casings supported by the first to fourth protrusions may be misaligned with each other in the columns in which the rollers are rotated.

The difference by which the third protrusion distance is larger than the first protrusion distance may be equal to a difference by which the second protrusion distance is larger than the fourth protrusion distance, and the sum of the differences being the double of the difference may be smaller than a distance between rotation axes of the plurality of rollers in the casings.

Further, the difference by which the third protrusion distance is larger than the first protrusion distance and the difference by which the second protrusion distance is larger than the fourth protrusion distance may be equally ¼ of the distance between the rotation axes of the plurality of rollers in the casings, and the sum of the differences may be ½ of the distance between the rotation axes of the plurality of rollers.

Details of other embodiments lie within the detailed description of the present disclosure and the drawings.

According to an end cap for a showcase roller shelf in an embodiment of the present disclosure, as an end cap structure supporting a plurality of rollers, which are installed on the shelf to enable sliding provisioning of goods displayed on the shelf, has a different support position in each column, even though roller units each having a plurality of rotatable rollers have an equal standardized length, misalignment between the rollers in the columns can lead to an increased contact area between the rollers and goods. Therefore, the goods may make a cloud movement by contacting with rollers at an accurate position, thereby increasing movement efficiency.

Further, the end cap for a showcase roller shelf according to the present disclosure is characterized in that the rotation positions of the center axes of rollers are changed in roller units by changing support positions at both ends of casings into which roller units are inserted. Since a roller unit having the same number of standardized rollers can be used in each column with a support position changed by the installation of the end cap can be used in a casing of each column, production cost can be reduced, and production efficiency can be increased.

In the end cap for a showcase roller shelf according to the present disclosure, both ends of roller units arranged in a plurality of columns are supported by a single body. Since protrusions may be provided at facing positions in each of the plurality of columns, and protrusions may be arranged alternately along the columns, the center axes of rollers are misaligned in the plurality of columns, just by installing roller units of the same dimensions in the columns. The resulting decrease in a contact area can increase assembly efficiency.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

A preferred embodiment of the present disclosure will be described in detail with reference to the attached drawings so that those skilled in the art may readily implement the present disclosure.

A description of a generally known technology with no direct relation to the present disclosure will be avoided lest it should obscure the subject matter of the present disclosure.

For the same reason, some components are shown as exaggerated, omitted, or schematic in the attached drawings. Further, the size of each component does not reflect an actual size wholly. Like reference numerals denote the same or corresponding components in the drawings.

Now, a description will be given of an end cap for a showcase roller shelf according to embodiments of the present disclosure with reference to the attached drawings.

Figure 1:
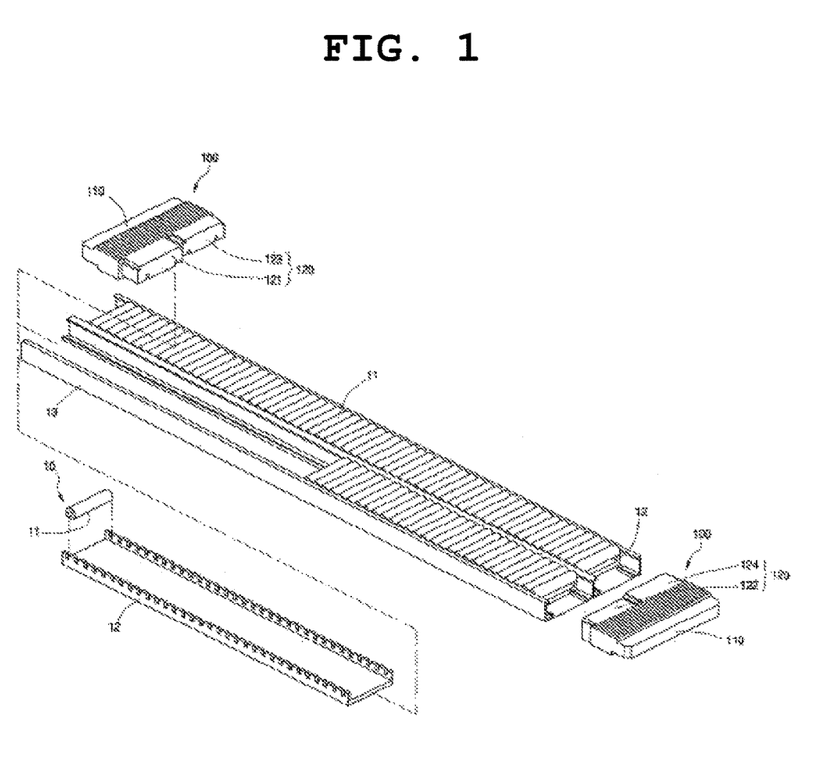
FIG. 1 is an exploded perspective view illustrating a state in which an end cap for a showcase roller shelf according to an embodiment of the present disclosure is installed to the showcase roller shelf.
Figure 2:
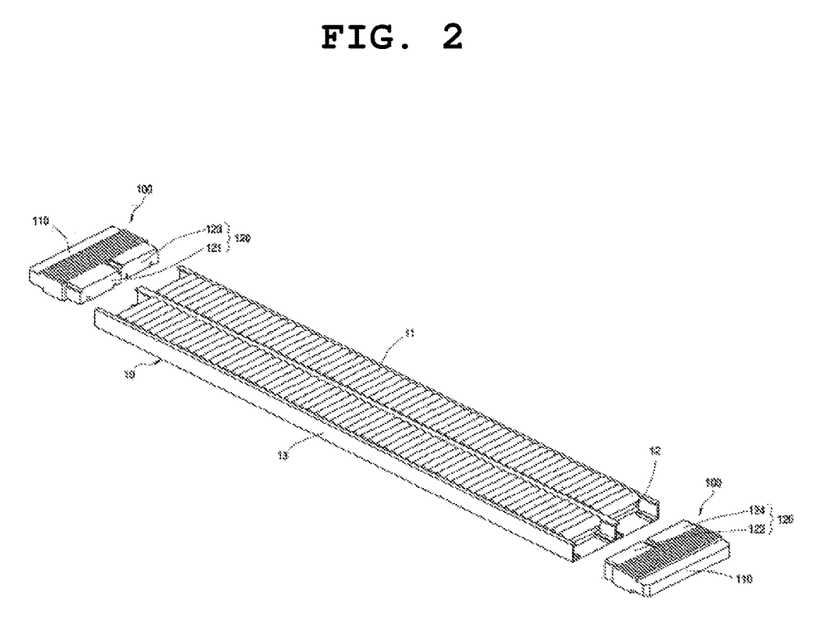
FIG. 2 is a perspective view illustrating the state in which the end cap for a showcase roller shelf, illustrated in FIG. 1, is installed to the showcase roller shelf.

FIG. 1 is an exploded perspective view illustrating a state in which an end cap for a showcase roller shelf according to an embodiment of the present disclosure is installed to the showcase roller shelf, and FIG. 2 is a perspective view illustrating the state in which the end cap for a showcase roller shelf illustrated in FIG. 1 is installed to the showcase roller shelf.

Referring to FIGS. 1 and 2, in the state where a plurality of rollers 11 are rotatably supported by each roller support 12 to enable goods in the showcase to slide to a withdrawal position, and roller units 10 each including a casing 13 surrounding the outer periphery of a roller support 12 are arranged in a plurality of columns, an end cap 100 for a showcase roller shelf according to an embodiment of the present disclosure is inserted into both ends of each of the casings 13.

As goods are continuously provided to a withdrawal position in cloud-contact with the plurality of rollers 11 and thus a loading position is higher than a providing position, each roller unit 10 is inclined. Thus, both ends of the casing 13 surrounding the rollers are at upper and lower positions, respectively. Accordingly, one of positions at which the end cap 100 is installed is defined as an upper part or position and the other position is defined as a lower part or position.

Further, a plurality of roller units 10 which are fabricated on a unit basis are arranged according to the latitudinal sizes of goods and the latitudinal area of a showcase shelf. An initial installation position of a roller unit 10 is defined as one side, and a direction in which a plurality of roller units 10 are arranged is defined as the other side.

These terms are defined for the convenience of description, and those skilled in the art will understand that the installation direction and positions of the roller units 10 are not limited.

The above-described end cap 100 for a showcase roller shelf includes cap bodies 110 and protrusions 12, which are installed at upper and lower ends of the casings 13 arranged in a plurality of columns.

The cap bodies 110 are disposed at facing positions at both ends of the casings 13, and installed at positions which are across both ends of the casings 13 arranged in the plurality of columns. The cap bodies 110 are installed at positions which are respectively across the upper and lower ends of the casings 13 arranged in the plurality of columns according to the width of the shelf, so as to support the upper and lower ends of all of the casings 13, respectively.

The cap bodies 110, which are inclined from top to bottom, are provided at upper and lower positions of the plurality of casings 13 arranged from one side to the other side. Each of the cap bodies 110 is installed at a position which is across from the one side to the other side at the upper or lower ends of the casings 13, so that protrusions 120 may be inserted into the casings 13.

The protrusions 120 protrude in directions in which the cap bodies 110 face each other. The protrusions 120 protrude at facing positions of the cap bodies 110, so that the protrusions 120 may be inserted into both ends of the casings 13 arranged in the plurality of columns. The protrusions 120 are provided with controlled protrusion distances, so that rollers 11 arranged in a plurality of columns at each of positions at which the plurality of casings 14 are inserted may have different rotation center positions between the columns. That is, as protrusions 120 with different protrusion distances in adjacent columns among the plurality of columns alternate with each other repeatedly, when the protrusions 120 are inserted into the casings 13, a plurality of rollers 11 are disposed with a different rotation center axis position in each of the plurality of columns. As a consequence, the contact area between goods and the rollers 11 is increased in each column.

Figure 3:
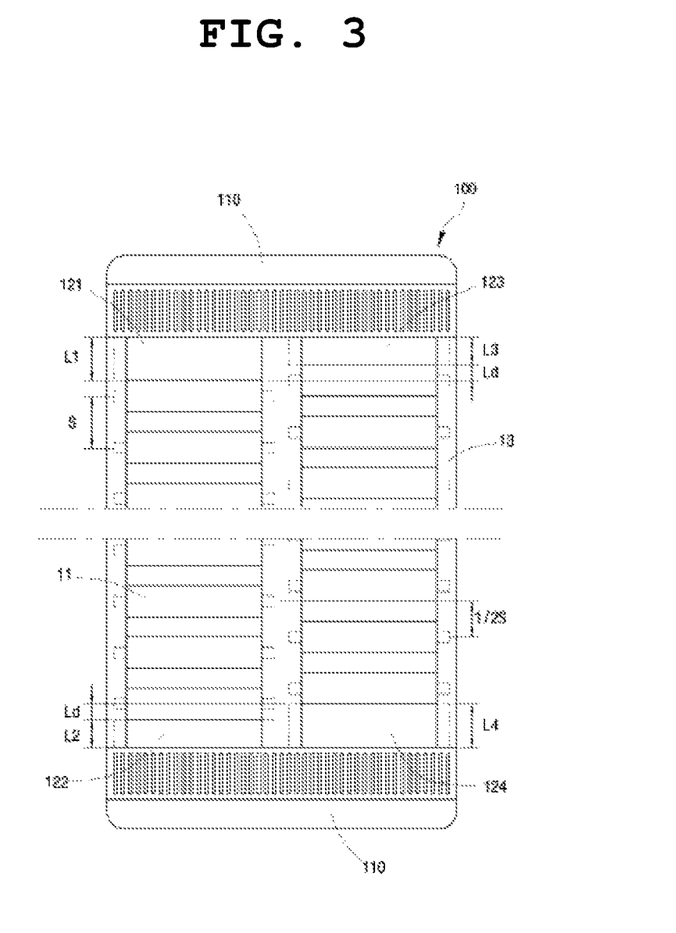
FIG. 3 is a plan view illustrating the state in which the end cap for a showcase roller shelf, illustrated in FIG. 1, is installed to the showcase roller shelf.
Figure 4:
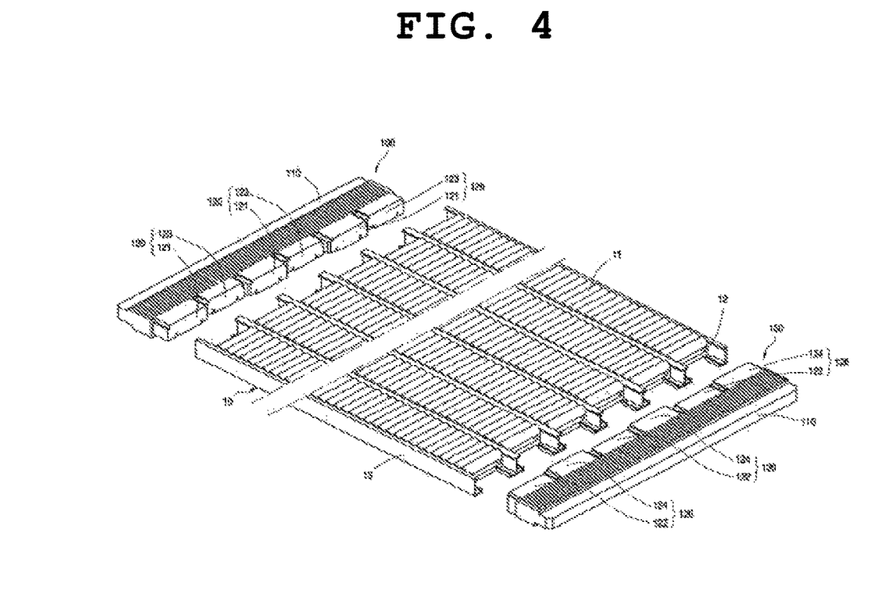
FIG. 4 is a perspective view illustrating a state in which a plurality of end caps for a showcase roller shelf illustrated in FIG. 1 are installed to the showcase roller shelf.

FIG. 3 is a plan view illustrating the state in which the end cap for a showcase roller shelf illustrated in FIG. 1 is installed to the showcase roller shelf, and FIG. 4 is a perspective view illustrating a state in which a plurality of end caps for a showcase roller shelf illustrated in FIG. 1 are installed to the showcase roller shelf.

FIGS. 3 and 4 illustrate one embodiment of the protrusions 120 which are important components of the end cap 100 for a showcase roller shelf according to the present disclosure. The protrusions 120 include a first protrusion 121, a second protrusion 122, a third protrusion 123, and a fourth protrusion 124.

The first protrusion 121 protrudes for a first protrusion distance L1 downwards from the end of one portion of the cap body 110 positioned in one part, so that the first protrusion 121 may be inserted into the upper end of the casing 13 at the end of the one side among the casings 13 arranged in the plurality of columns.

The second protrusion 122 is disposed in the lower part facing the first protrusion 121. The second protrusion 122 protrudes for a second protrusion distance L2 upwards from the cap body 110 positioned in the lower part, so that the second protrusion 122 may be inserted into the lower end of the casing 13 into which the first protrusion 121 is inserted supportedly.

The first protrusion 121 and the second protrusion 122 are provided to be inserted supportedly into the upper and lower ends of the casing 13 installed at the end of the one side, that is, at the first support position of the casings 13 arranged from the one side to the other side in the plurality of columns.

The third protrusion 123 is disposed at the other side portion adjacent to the first protrusion 121. The third protrusion 123 protrudes for a third protrusion distance L3 downwards from a casing 13 at the other side adjacent to the casing 13 supporting the first protrusion 121, so that the third protrusion 123 may be inserted supportedly into the upper end of the casing 13.

The fourth protrusion 124 is disposed in the lower part facing the third protrusion 123. The fourth protrusion 124 protrudes for a fourth protrusion distance L4 upwards from the cap body 110 positioned in the lower part, so that the fourth protrusion 124 may be inserted into the other end of the casing 13 into which the third protrusion 123 is inserted supportedly.

The first protrusion distance L1 is different from the third protrusion distance L3, and the second protrusion distance L2 is different from the fourth protrusion distance L4. Therefore, the rollers 11 are misaligned with each other to have different rotation center axis positions in the casings 13 corresponding to the first to fourth protrusion distances L1 to L4.

That is, the first protrusion distance L1 is larger than the third protrusion distance L3, and the fourth protrusion distance L4 is larger than the second protrusion distance L2 by the difference between the first protrusion distance L1 and the third protrusion distance L3. Thus, the positions of center axes upon which the rollers 11 are rotated are misaligned with each other in the casings 13.

In other words, the first protrusion 121 protrudes downwards in a direction to the second protrusion 122, further by Ld which is the difference by which for the first protrusion distance L1 larger than the third protrusion distance L3, and the fourth protrusion 124 protrudes upwards from the lower part facing the third protrusion 123, further by Ld. Therefore, the rollers 11 protruded upwards and downward in the casings 13 arranged in two columns may be disposed in misalignment with each other, with rotation center axis distances controlled.

The degree by which the first protrusion distance L1 is larger than the third protrusion distance L3 and the degree by which the fourth protrusion distance L4 is larger than the second protrusion distance L2 are equally Ld. 2×Ld is smaller than the distance S between the rotation axes of the plurality of rollers 11 installed in the casings 13. Therefore, the rollers 11 are disposed in the casings 13, with the positions of their center axes misaligned with each other.

That is, the first protrusion distance L1 is larger than the third protrusion distance L3 and the fourth protrusion distance L4 is larger than the second protrusion distance L2, by the same difference Ld. Therefore, the casing 13 into which the first and second protrusions 121 and 122 are supportedly inserted shifts the center axes of the rollers 11 downwards. Further, the casing 13 into which the third and fourth protrusions 123 and 124 are supportedly inserted shifts the center axes of the rollers 11 upwards. The sum of the distances for which the roller units 10 installed in the two casings 13 supported by the protrusions 120 are shifted upwards and downwards, that is, 2×Ld is set to be smaller than the distance S between the axes of the rollers 11. Therefore, the rollers 11 are misaligned with each other in the two columns, thereby increasing the contact area between goods and the rollers 11 during transfer.

Preferably, the degree Ld by which the first protrusion distance L1 is larger than the third protrusion distance L3 and the degree Ld by which the fourth protrusion distance L4 is larger than the second protrusion distance L2 are equally set to ¼ of the distance S between the rotation axes of the plurality of rollers 11 installed in the casings 13, so that 2×Ld becomes ½ of the distance S between the rotation axes of the rollers 11.

In the casings 13 in the two columns, the first protrusion distance L1 larger than the third protrusion distance L3 by Ld leads to an upward shift of the rotation center axes of the rollers 11 supported by the casing 13 at the one side by ¼ of the distance S between the axes of the rollers 11, and the fourth protrusion distance L4 larger than the second protrusion distance L2 by Ld leads to a downward shift of the rotation center axes of the rollers 11 supported by the casing 13 at the other side by ¼ of the distance S between the axe of the rollers 11. If the rollers 11 at the one side and the rollers 11 at the other side are shifted by ¼ of the distance S between axes in this manner, the rotation center axes of the rollers 11 at the other side are arranged at positions corresponding to ½ of the distance S between the axes of the rollers 11 at the one side. The resulting minimization of the gap between the rollers 11 may maximize a cloud-contact area.

The first protrusion 121 and the third protrusion 123 alternate with each other, thus being extended in the upper cap body 110 according to the length of the upper cap body 110, and the second protrusion 122 and the fourth protrusion 124 alternate with each other, thus being extended in the lower cap body 110 according to the length of the lower cap body 110. That is, roller units 10 having different roller positions can be repeatedly installed according to the lengths of the cap bodies 110, thereby increasing installation efficiency.

Figure 5:
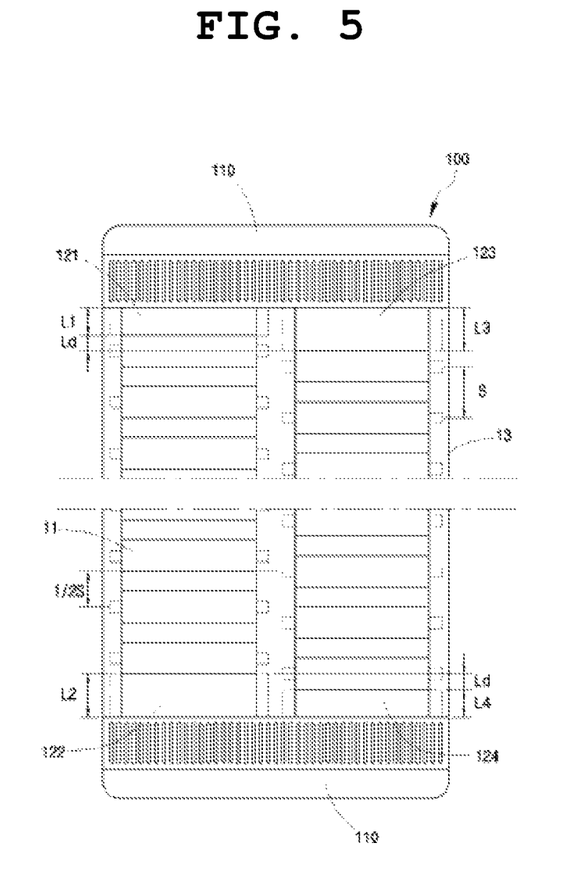
FIG. 5 is a plan view illustrating a state in which an end cap for a showcase roller shelf according to another embodiment of the present disclosure is installed to the showcase roller shelf.
Figure 6:
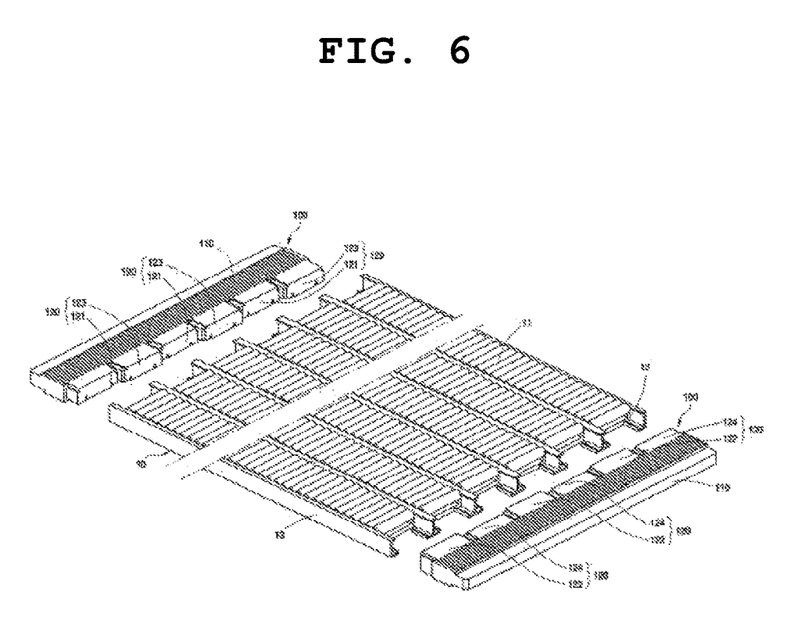
FIG. 6 is a perspective view illustrating the state in which the end cap for a showcase roller shelf illustrated in FIG. 5 is installed to the showcase roller shelf.

FIG. 5 is a plan view illustrating a state in which an end cap for a showcase roller shelf according to another embodiment of the present disclosure is installed to the showcase roller shelf, and FIG. 6 is a perspective view illustrating the state in which the end cap for a showcase roller shelf illustrated in FIG. 5 is installed to the showcase roller shelf.

FIGS. 5 and 6 illustrate another embodiment of the protrusions 120 which are important components of the end cap 100 for a show case roller shelf according to the present disclosure. The protrusions 120 includes the first protrusion 121, the second protrusion 122, the third protrusion 123, and the fourth protrusion 124. The positions and configurations of the protrusions 120 according to another embodiment are identical to those of the protrusions 120 illustrated in FIGS. 3 and 4, and thus only a different configuration will be described below.

The third protrusion distance L3 of the third protrusion 123 is larger than the first protrusion distance L1 of the first protrusion 121, and larger than the fourth protrusion distance L4 of the fourth protrusion 124 by the difference Ld between the third protrusion distance L3 and the first protrusion distance L1. Thus, the positions of center axes upon which the rollers 11 are rotated in the casings 13 are misaligned with each other in the respective columns.

In other words, the third protrusion 123 protrudes downwards in a direction to the fourth protrusion 124, further by the degree by which the third protrusion distance L3 larger than the first protrusion distance L1, and the second protrusion 122 protrudes upwards in the lower part facing the first protrusion 121, further by Ld. Therefore, the rollers 11 protruded upwards and downward in the casings 13 arranged in two columns may be positioned in misalignment with each other, with rotation center axis distances controlled.

The degree by which the third protrusion distance L3 is larger than the first protrusion distance L1 and the degree by which the second protrusion distance L2 is larger than the fourth protrusion distance L4 are equally Ld. 2×Ld is smaller than the distance S between the rotation axes of the plurality of rollers 11 installed in the casings 13. Therefore, the rollers 11 are disposed in the casings 13, with the positions of their center axes misaligned with each other in the respective columns.

That is, the third protrusion distance L3 is larger than the first protrusion distance L1 and the second protrusion distance L2 is larger than the fourth protrusion distance L4, by the same difference Ld. Therefore, the casing 13 into which the first and second protrusions 121 and 122 are supportedly inserted shifts the center axes of the rollers 11 upwards. Further, the casing 13 into which the third and fourth protrusions 123 and 124 are supportedly inserted shifts the center axes of the rollers 11 downwards. The sum of the distances for which the roller units 10 installed in the two casings 13 supported by the protrusions 120 shift upwards and downwards, that is, 2×Ld is set to be smaller than the distance S between the axes of the rollers 11. Therefore, the rollers 11 are misaligned with each other in the two columns, thereby increasing the contact area between goods and the rollers 11 during transfer.

Preferably, the degree Ld by which the third protrusion distance L3 is larger than the first protrusion distance L1 and the degree Ld by which the second protrusion distance L2 is larger than the fourth protrusion distance L4 are equally set to ¼ of the distance S between the rotation axes of the plurality of rollers 11 installed in the casings 13, so that 2×Ld becomes ½ of the distance S between the axes of the rollers 11.

In the casings 13 in the two columns, the third protrusion distance L3 larger than the first protrusion distance L1 by Ld leads to an upward shift of the rotation center axes of the rollers 11 supported by the casing 13 at the other side by ¼ of the distance S between axes, and the second protrusion distance L2 larger than the fourth protrusion distance L4 by Ld leads to a downward shift of the rotation center axes of the rollers 11 supported by the casing 13 at the one side by ¼ of the distance S between axes. If the rollers 11 at the one side and the rollers 11 at the other side are shifted by ¼ of the distance S between axes in this manner, the rotation center axes of the rollers 11 at the other side are arranged at positions corresponding to ½ of the distance S between the axes of the rollers 11 at the one side. The resulting minimization of the gap between the rollers 11 may maximize a cloud-contact area.

The first protrusion 121 and the third protrusion 123 alternate with each other, thus being extended in the upper cap body 110 according to the length of the upper cap body 110, and the second protrusion 122 and the fourth protrusion 124 alternate with each other, thus being extended in the lower cap body 110 according to the length of the lower cap body 110. That is, roller units 10 having different roller positions can be repeatedly installed according to the lengths of the cap bodies 110, thereby increasing installation efficiency.

Preferred embodiments of the present disclosure have been disclosed in the specification and drawings. While specific terms are used, they are used in their general meaning to describe the present disclosure and assist understanding of the present disclosure, not limiting the scope of the present disclosure. It will be apparent to those skilled in the art that other modification examples than the disclosed embodiments can be implemented without departing from the scope and spirit of the present disclosure.

The invention claimed is:

1. A showcase roller shelf, comprising:
    a plurality of casings arranged in a plurality of columns;
    a plurality of rollers disposed in each of the plurality of casings; and
    an end cap inserted supportedly into opposite ends of each of the plurality of casings, wherein the end cap comprises:
        cap bodies disposed at facing positions at the opposite ends of the casings, and installed at positions across the opposite ends of the casings; and
        a plurality of protrusions protruding at facing positions of the cap bodies and having protrusion distances, wherein the plurality of protrusions are inserted into the opposite ends of the casings, and the protrusion distances are controlled to place rotation centers of the plurality of rollers,
    wherein the protrusions distances of the protrusions are different in adjacent protrusions and same for every other protrusion, and
    wherein the end cap is inserted into the opposite ends of each of the casings in a state where the rollers are rotatably supported by each of a plurality of roller supports to slide products inside a showcase to a withdrawal position, roller units are arranged in a plurality of columns, and each of the roller units are included in the casing surrounding the outer periphery of a roller support.

2. The showcase roller shelf according to claim 1, wherein the protrusions of the end cap comprise:
    a first protrusion protruding for a first protrusion distance in a first direction from a first cap body, to be inserted into one end of a casing disposed at an end of one side among the casings arranged in the plurality of columns;
    a second protrusion disposed to face the first protrusion, and protruding for a second protrusion distance in a second direction from a second cap body, to be inserted into another end of the casing into which the first protrusion is inserted supportedly;
    a third protrusion disposed adjacent to the first protrusion, and protruding for a third protrusion distance in the first direction from the first cap body, to be inserted into one end of a casing positioned adjacent to the casing supporting the first protrusion; and
    a fourth protrusion disposed to face the third protrusion, and protruding for a fourth protrusion distance in the second direction from the second cap body, to be inserted into another end of the casing into which the third protrusion is inserted supportedly,
    wherein the first protrusion distance is different from the third protrusion distance and the second protrusion distance is different from the fourth protrusion distance, and positions of center axes of the rollers installed in the casings supported by the first to fourth protrusions are misaligned with each other, and
    wherein the first and third protrusions alternate with each other along a length direction of the first cap body, and the second and fourth protrusions alternate with each other along a length direction of the second cap body.

3. The showcase roller shelf according to claim 2,
    wherein the first protrusion distance is larger than the third protrusion distance, and the fourth protrusion distance is larger than the second protrusion distance by a difference by which the first protrusion distance is larger than the third protrusion distance, and
    wherein the positions of center axes of the rollers installed in the casings supported by the first to fourth protrusions are misaligned with each other in the columns in which the rollers are rotated.

4. The showcase roller shelf according to claim 3, wherein the difference by which the first protrusion distance is larger than the third protrusion distance is equal to a difference by which the fourth protrusion distance is larger than the second protrusion distance, and the sum of the differences being twice the difference is smaller than a distance between rotation axes of the plurality of rollers in the casings.

5. The showcase roller shelf according to claim 4, wherein the difference by which the first protrusion distance is larger than the third protrusion distance and the difference by which the fourth protrusion distance is larger than the second protrusion distance are equally ¼ of the distance between the rotation axes of the plurality of rollers in the casings, and the sum of the differences is ½ of the distance between the rotation axes of the plurality of rollers.

6. The showcase roller shelf according to claim 2,
    wherein the third protrusion distance is larger than the first protrusion distance, and the second protrusion distance is larger than the fourth protrusion distance by a difference by which the third protrusion distance is larger than the first protrusion distance, and
    wherein the positions of center axes of the rollers installed in the casings supported by the first to fourth protrusions are misaligned with each other in the columns in which the rollers are rotated.

7. The showcase roller shelf according to claim 6, wherein the difference by which the third protrusion distance is larger than the first protrusion distance is equal to a difference by which the second protrusion distance is larger than the fourth protrusion distance, and the sum of the differences being twice the difference is smaller than a distance between rotation axes of the plurality of rollers in the casings.

8. The showcase roller shelf according to claim 7, wherein the difference by which the third protrusion distance is larger than the first protrusion distance and the difference by which the second protrusion distance is larger than the fourth protrusion distance are equally ¼ of the distance between the rotation axes of the plurality of rollers in the casings, and the sum of the differences is ½ of the distance between the rotation axes of the plurality of rollers.

* * * * *